Feb. 14, 1961 H. J. WILLIAMS 2,971,575
FUEL FLOW CONTROL FOR ENGINES
Filed April 14, 1955 2 Sheets-Sheet 1

INVENTOR.
HOWARD J. WILLIAMS
BY
J. C. Wiessler
ATTORNEY

United States Patent Office 2,971,575
Patented Feb. 14, 1961

2,971,575

FUEL FLOW CONTROL FOR ENGINES

Howard J. Williams, South Bend, Ind., assignor to The Bendix Corporation, a corporation of Delaware Filed Apr. 14, 1955, Ser. No. 501,346

18 Claims. (Cl. 158—36.4)

This invention relates to fuel controls for combustion engines and more particularly to a fuel flow control for engines of the type commonly known as turbo-jet and turbo-prop.

It is well known that modern aircraft which are powered by gas turbine engines are particularly well adapted for flight at high altitudes ranging up to 50,000 or more feet. During any condition of engine operation it is, of course, particularly important that the quantity of combustible motive fluid or fuel flowing to the engine burners never decreases below that quantity which is necessary to sustain combustion in the relatively high velocity air streams which flow through said burners. Fuel control devices for modern day gas turbine engines must be capable of accurately controlling the fuel flow to the burners thereof under all conditions of operation, such as acceleration, deceleration and steady state, within wide ranges of engine speed and ambient temperature and pressure. It has been found that during any condition of engine operation when the total mass of air and fuel flowing to the burners is relatively small, such as during a high altitude engine deceleration, special consideration must be given to the problem of maintaining an adequate minimum level of fuel flow so that burner die-out or loss of combustion cannot occur. I have found that if, during any mode of engine operation when burner flame-out might occur, provision is made in a fuel control system for a subsidiary flow of fuel to the burners which is properly coordinated with the main flow of fuel thereto, the critically dangerous condition of loss of combustion in the burners will not occur.

It is therefore a primary object of this invention to provide means for limiting the minimum quantity of fuel flow to an engine under all conditions of operation thereof.

Another object of this invention is to provide means for maintaining a substantially unvarying minimum quantity of fuel flow to an engine irrespective of wide variations in engine operating conditions.

Another object of this invention is to provide means for maintaining a substantially unvarying minimum total mass of fuel flow to an engine irrespective of variations in engine operating conditions or temperature of the fuel flowing thereto.

A further object of this invention is to provide parallel fluid flow passages to combustion chambers of engines in which mechanism is coordinated to simultaneously decrease and increase the flow of fluid through the respective passages.

A still further object of this invention is to provide parallel fuel flow passages to burners of gas turbine engines, in one of which passages means is provided for increasing the flow of fuel to the burners as engine demand for fuel increases, and in the other of which passages means coordinated with the first mentioned means is provided for decreasing the flow of fuel to the burners as engine demand for fuel increases.

Additional objects and advantages of this invention will become apparent to those skilled in the art in view of the following description taken in conjunction with the drawings, wherein.

Figure 1:
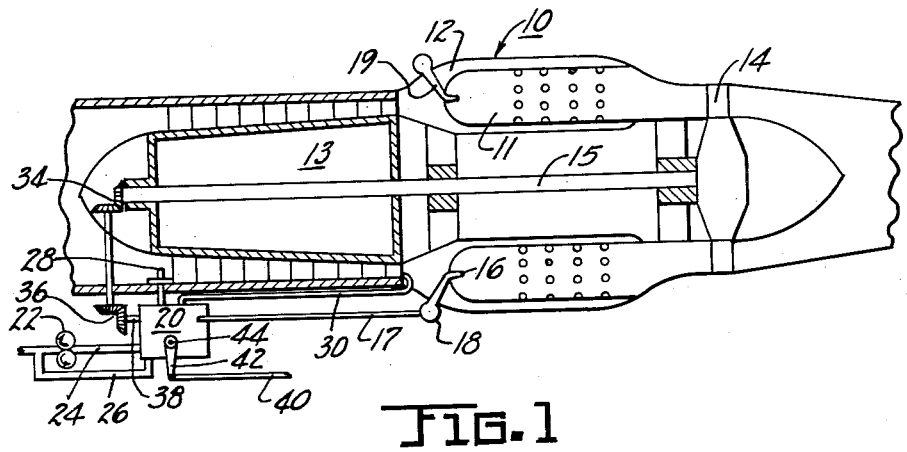
Figure 1 is a sectional schematic view of a gas turbine engine and a diagrammatically illustrated fuel control system connected thereto.
Figure 2:
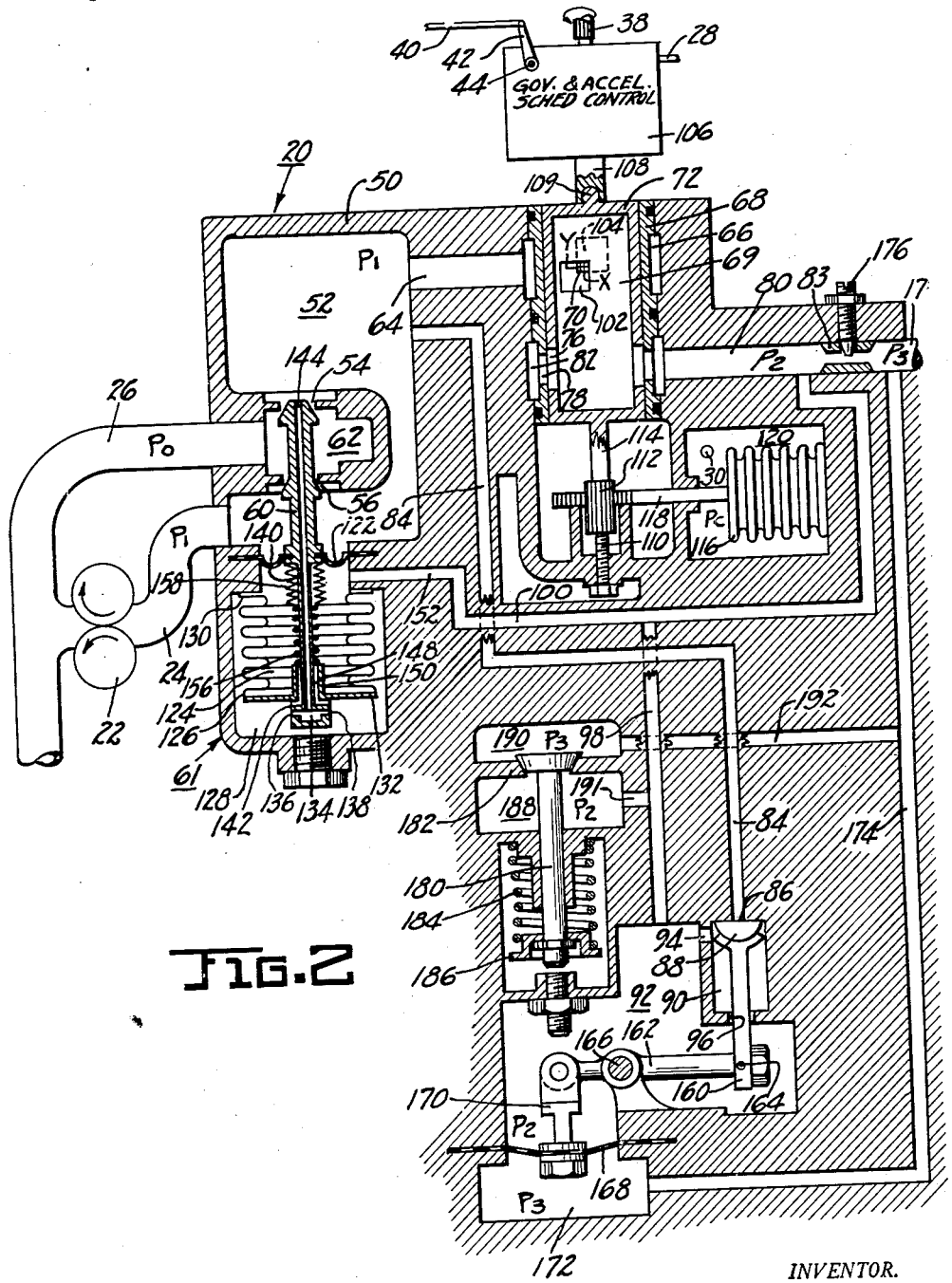
Figure 2 is a sectional schematic view of the fuel control illustrated in the fuel system of Figure 1.

Referring now to Figure 1, a gas turbine engine is generally indicated at 10 and includes a series of annularly disposed combustion chambers 11 mounted in a casing having a header or air intake section 12, and a compressor 13, shown as of the axial flow type, which is driven by means of a turbine 14 through a shaft 15. Each of the combustion chambers is provided with a burner nozzle 16 to which metered fuel is supplied under pressure by way of a conduit 17, a fuel manifold 18 and individual fuel lines 19. The conduit 17 receives metered fuel from a fuel control device which includes the applicant's minimum flow control as shown in Figure 2. A pump 22 supplies fuel under pressure to fuel control 20 through a conduit 24, a portion of which fuel may be by-passed back to the pump inlet through a conduit 26.

The fuel control 20 contains mechanism adapted to respond to compressor inlet temperature, as sensed by a temperature bulb and liquid filled passage 28, compressor discharge pressure, picked up by a Pitot tube 30, engine speed, which is transmitted to said control by means of a bevel gearing arrangement 34 and 36 and the governor drive shaft 38, and to the position of a pilot controlled lever 40, which is connected to the fuel control 20 by means of a lever 42 and a shaft 44.

Referring now to Figure 2, the minimum flow control and main fuel valves are shown contained within a housing 50 which receives fuel in a chamber 52 at a pressure $P_1$ from the pump 22 and inlet conduit 24. During most conditions of engine operation the minimum flow control, which is shown in the lower portion of housing 50, does not pass any fuel, and the total flow of fuel into chamber 52 is divided into two flow paths, one of which returns a portion of the fuel to pump inlet conduit 26 by way of by-pass ports 54 and 56 and a by-pass chamber 62, and the other of which conducts the remainder of the fuel to the burner nozzles 16 by way of a conduit 64, an inlet annulus 66 formed between the housing and a fixed cylindrical sleeve member 68, a chamber 69 formed by an axially and rotatably actuatable hollow cylindrical metering valve 72 and connected to annulus 66 by a main metering port 70, valve and sleeve outlet ports 76 and 78, a conduit 80 connected to said ports by an outlet annulus 82, an adjustable minimum flow restriction 83, the discharge conduit 17, and the fuel manifold and fuel lines 18 and 19. The by-pass ports 54 and 56 are controlled by a double landed poppet valve 60 which is controlled to maintain a constant pressure differential across metering port 70 by a regulator unit 61. During any mode of engine operation when the minimum flow control is operative to regulate a flow of fuel, a portion of the total flow of fuel from chamber 52 is also conducted to discharge conduit 17 and the burner nozzles 16 by way of a flow path which by-passes the metering valve 72 comprising a passage 84, a variable port 86 controlled by a minimum flow control valve 88, a chamber 90, a chamber 92 containing fuel at a pressure $P_2$ and connected to the chamber 90 by ports 94 and 96, passages 98 and 100, conduit 80, and the minimum flow restriction 83.

A square port 102 formed in the wall of metering valve 72 is adapted to variably register with a square port 104 formed in the wall of the fixed sleeve member 68 to vary the effective area of the metering port 70, which connects the inlet annulus 66 to the valve chamber 69. The metering port 70 is either square or rectangular in shape and the area thereof is determined by dimensions $x$ and $y$; dimension $x$ is varied whenever the rotational position of the metering valve changes, and dimension $y$ is varied whenever the axial position of the valve changes. Mechanism for controlling the axial and rotational positions of valve 72, which is herein shown somewhat diagrammatically, is disclosed in detail and in various embodiments in copending applications Serial Nos. 248,402, filed in the name of H. C. Ziesloft on September 26, 1951, now abandoned, and 499,432, filed in the names of H. J. Williams, B. J. Ryder and F. R. Rogers on April 4, 1955 (common assignee).

An engine all-speed governor control responsive to engine speed and the position of pilot controlled lever 42, and an acceleration fuel scheduling control responsive to engine speed and compressor inlet temperature, are shown in diagrammatic form at 106, said governor and acceleration controls being arranged in mutually overriding relation such that that one which allows the least quantity of fuel to flow through metering port 70 controls the $y$ dimension thereof. The governor portion of control 106 controls the axial position of valve 72, or $y$ dimension of port 70, during governor cut-off and engine equilibrium operation, whereas the acceleration scheduling portion of said control, including a contoured three dimensional cam actuatable as a function of engine speed and compressor inlet temperature, varies the axial position of the metering valve during an acceleration of the engine in accordance with a predetermined schedule. The control 106 is connected to the metering valve by a rod 108 and a ball joint 109. An adjustable minimum flow stop 110, which is mounted in the housing 50, is shown abutting one end of a pinion 112 which is connected to the valve 72 by a rod 114. Abutment between the minimum flow stop 110 and the pinion 112 exists only during a deceleration of the engine, which may be initiated by resetting the governor portion of control 106 to a lower than existing speed. Initiation of an engine deceleration results in a closing movement of the valve 72 to the position shown; the resulting fixed minimum $y$ dimension of port 70 obtains until such time as governor action returns the engine to equilibrium operation at the new selected speed.

The rotational position of metering valve 72 and the $x$ dimension of port 70 are controlled by an evacuated bellows 116 which is connected to the pinion 112 by a rack 118, said bellows being mounted in a chamber 120 which is connected to the discharge side of compressor 13 by the conduit 30. A variation in compressor discharge pressure results in a like variation in the pressure in chamber 120 and a movement or change in length of bellows 116 which is proportional to the change in compressor discharge pressure, said change in length effecting a corresponding change in the rotational position of valve 72 through the rack and pinion 118 and 112. For example, an increase in compressor discharge pressure causes a partial collapse of bellows 116 and a counterclockwise movement of pinion 112 and valve 72, when viewed from the pinion end, which increases the $x$ dimension of metering port 70 an amount which is proportional to the increase in discharge pressure.

The poppet valve 60 of the pressure head regulator unit 61 is connected to a flexible diaphragm 122 which separates the chamber 52 from a chamber 124 formed interiorly of a bellows 126, said bellows being mounted in a chamber 128, connected to the control housing at 130 and having an end plate member 132 connected to the movable end thereof and formed to define a chamber 134 and flow control ports 136 and 138. A pilot valve 140 comprises an extension of valve 60 and terminates in a flow control land 142 which registers with ports 136 and 138 for the purpose of controlling a circulation of servo fuel flow therethrough in a manner to be described. A passage 144 passes through the valves 60 and 140 to connect chamber 52 to the chamber 134. The chamber 134 is connected to conduit 80 by a way of the lower portions of ports 136 and 138, chamber 128, the upper portions of said ports, an annulus 148, which is formed between the walls of a hollow hub 150 of plate member 132 and the pilot valve 140, the bellows chamber 124, passage 152, and the passage 100. A pressure head regulator spring 156, which urges the valves 60 and 140 in an upward or closing direction and which is opposed by the pressure drop $P_1-P_2$ acting on diaphragm 122, encircles the pilot valve 140 and is mounted between hub 150 and a stack of fuel temperature responsive bi-metallic disks 158 which are anchored at the diaphragm end thereof to valve 60.

The by-pass valve 60 is controlled by the regulator unit 61 to maintain a constant pressure differential $P_1-P_2$ across metering port 70 and minimum flow control port 86 irrespective of variations in the areas of said ports. It is apparent that the value of the pressure drop $P_1-P_2$ is always directly proportional to the force output of spring 156, since the valve 60 will always assume that position which will cause a force to be generated across diaphragm 122 that is equal to the force of spring 156. The pilot valve 140 and bellows 126 are controlled to function so as to maintain a constant length of spring 156 irrespective of variations in the position of valve 60. A constant length spring acts as a rateless spring, and therefore the pressure drop $P_1-P_2$ may be maintained constant for all positions of valve 60.

The bellows 126 is urged in a downward or expanding direction by the spring 156 and is opposed in such movement by a force resulting from a pressure differential $(P_s-P_2)$ between chambers 128 and 124 which acts on the end member 132 of the bellows. The land 142 of pilot valve 140 is adapted to control the circulation of fuel through ports 136 and 138 in such a manner that the pressure differential across bellows 126 is maintained at a substantially constant value; this results in the maintenance of a constant length of spring 156 irrespective of the position of by-pass valve 60, as will be seen from the following.

Whenever the engine is operating at an equilibrium condition dimensions $x$ and $y$ of metering port 70 are fixed, and by-pass valve 60 maintains a fixed position to control a constant pressure drop across the metering port. With the position of valve 60 fixed, pilot valve 140 is positioned such that the flow from chamber 52 to chamber 128 through passage 144 and ports 136 and 138 is equal to the flow of fuel from chamber 128 to bellows chamber 124 through ports 136 and 138 and annulus 148, whereby the force produced by the pressure differential across bellows plate 132 is fixed and balances the opposing force of spring 156. If the pilot should initiate an engine acceleration from such an equilibrium condition by rotating the throttle lever 42 to increase the $y$ dimension of the metering port, a momentary decrease in the pressure drop across said metering port and across diaphragm 122 would result, thereby allowing regulator spring 156 to actuate valve 60 towards a closed position to decrease the by-pass flow and to tend to re-establish the desired pressure drop $P_1-P_2$. As valve 60 moves towards closed position the spring 156 lengthens and the pilot valve land 142 is actuated upwardly to cause an increase in the fuel flow into chamber 128 from chamber 52 and a corresponding decrease in the fuel flow from chamber 128 to bellows chamber 124, thereby effecting an increase in the pressure drop across the bellows to compress said bellows until the flows into and out of chamber 128 are again equal. As the bellows is compressed during follow-up action thereof, spring 156 is compressed to its former length, at which length servo valve land 142 has returned to null position. A demand for a decrease in fuel flow to the engine, as during a deceleration of the engine, results in a closing of metering ports 70, a corresponding momentary increase in the pressure drop across said port and diaphragm 122, a resultant opening movement of valve 60 and corresponding momentary compression of the regulator spring 156, and downward movement of pilot valve 140 which causes a decrease in the flow fuel into chamber 128 and an increase in the flow from said chamber into bellows chamber 124. This latter flow change causes a decrease in the differential pressure across said bellows and expanding movement thereof until the flow through ports 136 and 138 around valve land 142 effects a spring balancing force across bellows plate 132. This condition of balance is attained when the bellows has moved to return the spring 156 to its original length.

From the above it is apparent that the pressure drop across metering port 70 is maintained at a constant value by regulator unit 61 irrespective of the position of by-pass valve 60.

The bi-metallic disks 158 are provided to vary the force output of spring 156 as required to maintain a constant mass of fuel flow through metering port 70 at any given area thereof, irrespective of variations in the temperature of the fuel flowing through the control system. For example, if the temperature of the fuel should increase, the bi-metallic disks expand an amount proportional to the increase in temperature to compress spring 156 a slight amount and establish a somewhat higher pressure differential $P_1—P_2$ at the higher fuel temperature. On the other hand, a decrease in said temperature results in a contracting movement of the disks 158 and a slight lengthening of spring 156 to cause a slight decrease in the pressure drop $P_1—P_2$ at the lower temperature. This result is desirable inasmuch as it effects a variation in pressure drop with variations in fuel temperature, so that the heating value or mass of the fuel flowing per unit time does not vary with variations in the specific gravity of the fuel.

The minimum flow control valve 88 is cradled in a member 160 which is pivoted to one end of a lever 162 at 164, said lever being fulcrumed at 166 and connected at the other end thereof to a flexible diaphragm 168 by a member 170. The diaphragm 168 divides the $P_2$ pressure chamber 92 from a $P_3$ pressure chamber 172 which is connected to the downstream side of the minimum flow restriction 83 by a conduit 174. The effective area of minimum flow restriction 83 is adjustable by a threaded member 176.

Normally, during operation of the engine, the quantity of metered fuel flowing to the engine through port 70, conduit 80 and restriction 83 is sufficiently high to produce a pressure drop $P_2—P_3$ across said restriction which, as imposed across diaphragm 168, maintains the minimum flow control valve 88 in a closed position with respect to port 86, thereby disallowing a flow of by-pass fuel around metering valve 72 by way of conduit 84, chamber 90, ports 94 and 96, chamber 92, and conduits 98 and 100. However, during any condition of engine operation when the fuel flow through restriction 83 decreases to a predetermined minimum value, the force imposed on the face of control valve 88 by the pressure $P_1$ in passage 84 becomes sufficient to actuate lever 162 in a clockwise direction about fulcrum 166 against the opposing force across diaphragm 168, thereby allowing fuel to flow to the engine burners through the by-pass circuit around metering valve 72. The by-passed fuel flows into conduit 80 upstream of restriction 83, and it will therefore be apparent that irrespective of variations in metering port 70 below a predetermined area, the minimum flow control valve 88 will function to regulate a constant pressure drop across flow restriction 83, thereby establishing, with metering valve 72, a constant limited minimum fuel flow to the engine. The established minimum fuel flow to the engine will continue to be maintained until such time as the values of the engine operating parameters to which the metering valve 72 responds are such that the area of metering port 70 allows a quantity of fuel to pass therethrough which is sufficient to increase the pressure drop across minimum flow restriction 83 above that which is maintained by control valve 88. In other words, whenever the engine demand for fuel is greater than that quantity regulated by the minimum flow control, the pressure differential across diaphragm 168 will maintain control valve 88 in a closed position, and the total quantity of fuel flowing to the engine will pass through the metering port 70.

The level of fuel flow which the minimum flow control maintains is adjustable by threaded member 176; i.e. if member 176 is adjusted to increase or decrease the area of restriction 83, the level of flow therethrough during minimum flow conditions will increase or decrease, respectively. It will be apparent that engine parameter responsive flow valve means may be substituted in conduit 80 for the restriction 83 in order to vary the minimum flow area during operation of the engine as a function of a sensed parameter; this would establish a schedule or variation in the minimum flow characteristic as a function of the sensed parameter. For example, if such a valve were made to move in an opening direction with an increase in engine speed or compressor discharge pressure, the minimum flow characteristic would not be constant, but would increase with increasing speed or discharge pressure as the flow control valve 88 responded to maintain a constant differential across the increasing area of the minimum flow valve.

Figure 3:
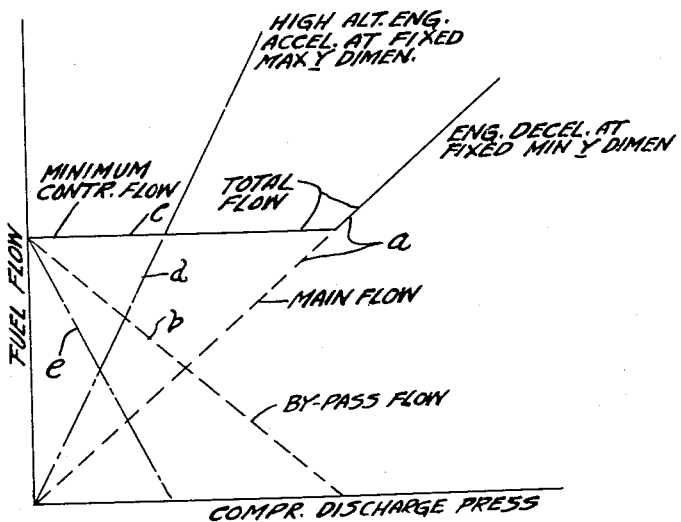
Figure 3 is a curve chart illustrating the operational characteristics of the fuel control shown in Figure 2.

The minimum flow control is normally operative to regulate fuel flow with metering valve 72 during a high altitude deceleration when the axial position of valve 72 is fixed by minimum flow stop 110, as shown, and compressor discharge pressure is at a low value, thereby fixing a relatively small $x$ dimension of the metering port, as shown. However the minimum flow control will also respond during any other condition of operation, such as steady state or acceleration at very high altitudes, to limit the minimum flow to the engine. During an acceleration, for example, at a very high altitude the compressor discharge pressure will be so low that the $x$ dimension of metering port 70 will be extremely small, and the flow through said port may be less than that required by the minimum flow control, in which case said control would be operative to regulate the minimum allowable fuel flow through restriction 83. The coordination between the operation of the minimum flow control and the main metering valve is illustrated in the curve chart of Figure 3, wherein fuel flow to the engine is plotted against compressor discharge pressure. Curve $a$ illustrates the relationship between fuel flow through the metering port 70 and increasing compressor discharge pressure when the metering valve abuts minimum flow stop 110, as shown. Curve $b$ illustrates a like relationship for the bypass flow through control valve 88. As is apparent, the flow through the bypass circuit is shut-off by the control valve 88 at a particular compressor discharge pressure; i.e. at a particular area of metering port 70. In that range of compressor discharge pressures in which the minimum flow control is operative to regulate fuel flow, the addition of the fuel flow indicated by curve $a$ to the fuel flow indicated by curve $b$ results in a constant minimum flow characteristic as illustrated by curve $c$. At the point of intersection between curves $a$ and $c$ the flow through the metering valve is sufficient to establish a differential across the restriction 83 which results in closing control valve 88, and a further increase in the main flow follows the total flow curve illustrated, which curve denotes the deceleration characteristic of the engine when the $y$ dimension of metering port 70 is fixed by the minimum flow stop 110.

If the $y$ dimension were fixed during an acceleration at high altitude, as for example by a fixed maximum flow stop, the relationship between the main and by-pass flows would be as represented by curves $d$ and $e$, respectively. Since, however, the $y$ dimension is varied as a function of engine speed by acceleration scheduling control 106 during an acceleration of the engine at any given compressor inlet temperature, the main flow characteristic acceleration curve would cut across an entire family of fixed $y$ dimension curves, not shown, and would be matched by the operation of the by-pass flow control at every flow value up to minimum flow to establish the minimum flow characteristic curve $c$.

A check valve 180 controls a restriction 182 and is urged in a closing direction by a spring 184, which abuts the housing at one end thereof and a spring retainer 186 connected to said valve at the other end thereof. Chambers 188 and 190 are formed in the housing on opposite sides of said valve, chamber 188 being connected to $P_2$ pressure passage 98 by a passage 191, and chamber 190 being connected to $P_3$ pressure passage 174 by a passage 192. The pressure difference across the check valve 180 urges said valve in an opening direction against spring 184; whenever said valve is open, fuel may by-pass minimum flow restriction 83 by way of passages 100, 98 and 191, chamber 188, restriction 182, chamber 190, and passages 192 and 174. The setting of spring 184 is preferably such that the check valve cannot open prior to the closing of control valve 88; i.e. whenever valve 88 is operative to regulate the minimum flow to the engine valve 180 is preferably closed. The purpose of the check valve 180 is to limit the maximum differential pressure which can exist across the minimum flow restriction 83. In other words, check valve 180 simply provides for a division of the metered fuel flowing in conduit 80 upstream of restriction 83 so that the pressure drop across said restriction does not exceed a predetermined value. Obviously, the check valve in no way varies or controls the flow of fuel to the engine, which is metered by valve 72, but simply provides a by-pass circuit around the minimum flow restriction.

From the above it is apparent that I have provided a minimum flow control for engines which may be utilized to control either a constant or a varying total minimum flow of fuel to the engine under certain conditions of operation thereof. This result has been attained by providing flow control means comprising a metering element for varying metered fuel flow as a function of area, means for maintaining a fixed pressure differential across the metering area at any given fuel temperature and under all conditions of engine operation, and flow control means in parallel with the metering element for decreasing the circuit flow of fuel therethrough as a function of an increase in flow of fuel through the metering element.

It will be apparent to those skilled in the art that various changes in the structure and relative arrangement of parts may be made to suit requirements without departing from the scope of my invention.

I claim:

1. A fuel flow control for an engine comprising conduit means for conducting fuel to the engine, said conduit means including parallel branch passages leading to a fuel flow restriction, first valve means for controlling the fuel flow through one of said branch passages, second valve means responsive to the fuel flow through said restriction for controlling the flow of fuel through the other of said branch passages, said first and second valve means being simultaneously operable in coordinated relation with each other during a certain range of operation in such a manner that the flow controlled by said second valve means decreases in relation to an increase in flow through said restriction as controlled by said first valve means.

2. A minimum flow control for an engine comprising conduit means for conducting fuel to the engine which includes parallel branch passages leading to a fuel flow restriction, first valve means for controlling the flow of fuel through one of said branch passages, second valve means for controlling the flow of fuel through the other of said branch passages, said second valve means being responsive to the fuel flow through said restriction, and with said first and second valve means being simultaneously operable in coordinated relation with each other during a certain range of engine operation in such a manner that the fuel flow controlled by said second valve means decreases at substantially the same rate that the fuel flow controlled by said first valve means increases, whereby the sum of the flows through said branch passages and therefore through said restriction is controlled to a substantially constant value.

3. In combination, a fluid flow conduit means for conducting a fluid to a point of discharge, first and second parallel branch passages in said conduit means, first valve means in said first passage for controlling the fluid flow therethrough, second valve means in said second passage for controlling the fluid flow therethrough, a flow restriction in said conduit means downstream of said parallel passages, and means responsive to the fluid pressure drop across said flow restriction for varying the flow regulating position of said second valve means in inverse relation to the flow regulating position of said first valve means.

4. A combination as claimed in claim 3 wherein means are provided for varying the area of said flow restriction.

5. A combination as claimed in claim 3 plus a third branch passage in said conduit means in parallel with said flow restriction, and third valve means in said third branch passage responsive to the fluid pressure drop across said flow restriction for limiting the maximum pressure drop which can obtain across said flow restriction.

6. A combination as claimed in claim 3 wherein the flow regulating position of said second valve means is controlled by said pressure drop responsive means in such a manner that the sum of the flows through said parallel passages is maintained at a substantially constant value.

7. In a fuel feeding system for a gas turbine engine having a burner, conduit means including first and second parallel passages for conducting fuel to the burner, first and second valve means located in said first and second parallel passages respectively for controlling the fuel flow through said conduit means, a flow restriction in said conduit means, means responsive to an engine operating condition for controlling said first valve means in such a manner that said valve means is actuated in a fuel flow increasing direction with an increase in the value of said condition, and means responsive to the fuel pressure drop across said restriction for controlling said second valve means in such a manner that said valve means is actuated in a fuel flow decreasing direction an amount which is a function of the fuel flow increasing movement of said first valve means.

8. In a fuel feeding system for a gas turbine engine having a burner, conduit means including first and second parallel passages for conducting fuel to the burner, first and second valve means located in said first and second parallel passages respectively for controlling the fuel flow through said conduit means, a flow restriction in said conduit means, means responsive to an engine operating condition for controlling said first valve means in such a manner that said valve means is actuated in a fuel flow decreasing direction with a decrease in the value of said condition, and means responsive to the fuel pressure drop across said restriction for controlling said second valve means in such a manner that said valve means is actuated in a fuel flow increasing direction an amount which is a function of the fuel flow decreasing movement of said first valve means.

9. A fuel feeding system as claimed in claim 7 wherein said flow restriction is located downstream of both of said parallel passages in said conduit means.

10. A fuel feeding system as claimed in claim 7 plus means for varying the area of said flow restriction.

11. In a fuel feeding system for a gas turbine engine having a burner, conduit means for conducting fuel to the burner, first and second parallel passages in said conduit means, first and second fuel flow restrictions in said first and second passages, respectively, first and second valve means controlling the flow regulating area of said first and second restrictions, respectively, a third restriction in said conduit means downstream of said first and second passages, and means responsive to the fuel pressure drop across said third restriction and operatively connected to said second valve means for controlling the flow of fuel through said second restriction in inverse relation to the flow of fuel controlled by said first valve means through said first restriction.

12. A fuel feeding system as claimed in claim 11 wherein said second valve means is controlled by said pressure responsive means to vary the flow of fuel through said second restriction in such a manner that said fuel flow decreases at a rate substantially equal to the increase in fuel flow through said first restriction during operation of the engine, whereby the fuel flow through said conduit means is controlled to a substantially constant value.

13. A fuel feeding system as claimed in claim 12 wherein means is provided for varying the area of said third restriction, whereby the total flow of fuel through said conduit means will vary as a function of the adjusted position of said area varying means.

14. A fuel feeding system as claimed in claim 11 wherein said second valve means is responsive to maintain a substantially constant pressure differential across said third restriction.

15. A fuel feeding system as claimed in claim 11 wherein means is provided for maintaining a constant fuel pressure drop across said first and second restrictions at any given temperature of the fuel flowing.

16. In a fuel feeding system for an engine, conduit means for conducting fuel flow to the engine, first and second passages in parallel in said conduit means, a flow restriction in said conduit means downstream of said first and second passages, first valve means controlling the flow of fuel through said first passage as a function of an engine operating condition, and second valve means controlling the flow of fuel through said second passage, and means responsive to the fluid pressure drop across said restriction operatively connected to said second valve means operative to close said second valve means upon increase of said pressure drop to a certain quantity.

17. A fuel feeding system as claimed in claim 16 wherein said conduit means includes a third passage in parallel with said flow restriction, and valve means in said third passage responsive to the fuel pressure drop across said flow restriction.

18. A fuel feeding system as claimed in claim 16 wherein said pressure responsive means controls said second valve means in such a manner that the flow of fuel through said second passage decreases at a rate which is equal to the rate of increase in fuel flow through said first passage, whereby the flow of fuel through said conduit means is maintained at a constant value.

References Cited in the file of this patent

UNITED STATES PATENTS

| | | |
|---|---|---|
| 2,422,808 | Stokes | June 24, 1947 |
| 2,440,566 | Armstrong | Apr. 27, 1948 |
| 2,545,856 | Orr | Mar. 20, 1951 |
| 2,688,841 | Decher | Sept. 14, 1954 |
| 2,758,638 | Lawrence | Aug. 14, 1956 |
| 2,764,231 | Jubb | Sept. 25, 1956 |